US012645934B2

(12) United States Patent (10) Patent No.: US 12,645,934 B2

Choi et al. (45) Date of Patent: Jun. 2, 2026

(54) METHOD AND SYSTEM FOR TRAINING AUTONOMOUS DRIVING AGENT ON BASIS OF DEEP REINFORCEMENT LEARNING

(71) Applicant: NAVER CORPORATION, Seongnam-si (KR)

(72) Inventors: Jinyoung Choi, Seongnam-si (KR); Kay Park, Seongnam-si (KR); Minsu Kim, Seongnam-si (KR); Sangok Seok, Seongnam-si (KR); Joonho Seo, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 997 days.

(21) Appl. No.: 17/466,450

(22) Filed: Sep. 3, 2021

(65) Prior Publication Data

US 2021/0397961 A1 Dec. 23, 2021

Related U.S. Application Data

(63) Continuation of application No. PCT/KR2020/001692, filed on Feb. 6, 2020.

(30) Foreign Application Priority Data

Mar. 5, 2019 (KR) ........................ 10-2019-0025284

(51) Int. Cl.
  *G06N 3/08* (2023.01)
  *G01S 17/931* (2020.01)
  (Continued)

(52) U.S. Cl.
  CPC .............. *G06N 3/08* (2013.01); *G01S 17/931* (2020.01); *G05D 1/0214* (2013.01);
  (Continued)

(58) Field of Classification Search
  CPC ...... G06N 3/092; G06N 3/044; G06N 3/0442; G05D 1/0221; G05B 2219/33056
  See application file for complete search history.

(56) References Cited

FOREIGN PATENT DOCUMENTS

JP 2018-126797 A 8/2018
JP 2019-031268 A 2/2019
  (Continued)

OTHER PUBLICATIONS

Tai L, Paolo G, Liu M. Virtual-to-real deep reinforcement learning: Continuous control of mobile robots for mapless navigation. In2017 IEEE/RSJ international conference on intelligent robots and systems (IROS) Sep. 24, 2017 (pp. 31-36). IEEE. (Year: 2017).*

(Continued)

*Primary Examiner* — Schyler S Sanks

(74) *Attorney, Agent, or Firm* — Harness, Dickey & Pierce, P.L.C.

(57) ABSTRACT

Disclosed are a method and a system for training an autonomous driving agent on the basis of deep reinforcement learning (DRL). The agent training method according to one embodiment may comprise a step of training an agent through an actor-critic algorithm in a simulation for DRL. The step of training may include inputting first information to an actor network to determine an action of the agent, and inputting second information to a critic to evaluate how helpful the action is to maximizing a reward in the actor-critic algorithm, the second information comprising the first information and additional information.

11 Claims, 7 Drawing Sheets

(51) Int. Cl.
    *G05D 1/00*        (2024.01)
    *G06N 3/0442*    (2023.01)
(52) U.S. Cl.
    CPC ......... *G05D 1/0221* (2013.01); *G05D 1/0274*
              (2013.01); *G06N 3/0442* (2023.01)

(56) References Cited

FOREIGN PATENT DOCUMENTS

| | | | |
|---|---|---|---|
| JP | 2019/530105 | A | 10/2019 |
| KR | 10-1539270 | B1 | 7/2015 |
| KR | 10-2018-0034553 | A | 4/2018 |
| WO | WO-2018/083532 | A1 | 5/2018 |
| WO | WO-2018/083671 | A1 | 5/2018 |

OTHER PUBLICATIONS

Lin M, Chen Q, Yan S. Network in network. arXiv preprint arXiv:1312.4400. Dec. 16, 2013. (Year: 2013).*

Brunner G, Richter O, Wang Y, Wattenhofer R. Teaching a machine to read maps with deep reinforcement learning. In Proceedings of the AAAI conference on artificial intelligence Apr. 29, 2018 (vol. 32, No. 1) (Year: 2018).*

M. Pfeiffer, M. Schaeuble, J. Nieto, R. Siegwart, C. Cadena. (2017). arXiv:1609.07910v3 [cs.RO] Nov. 6, 2018 "From Perception to Decision: A Data-driven Approach to End-to-end Motion Planning for Autonomous Ground Robots" in IEEE International Conference on Robotics and Automation (ICRA), 2017 (Year: 2017).*

Foerster, Jakob, et al. "Counterfactual multi-agent policy gradients." Proceedings of the AAAI conference on artificial intelligence. vol. 32. No. 1. 2018. (Year: 2018).*

Kollar, Thomas, and Nicholas Roy. "Trajectory optimization using reinforcement learning for map exploration." The International Journal of Robotics Research 27.2 (2008): 175-196. (Year: 2008).*

Extended European Search Report issued on Dec. 23, 2022 in European Application No. 20765632.3.

Lei Tai et al., "Virtual-to-real Deep Reinforcement Learning: continuous Control of Mobile robots for Mapless Navigation," Cornell University Library, Mar. 2, 2017.

Linhai Xie et al., "Towards Monocular Vision based Obstacle Avoidance through Deep Reinforcement Learning," Cornell University Library, Jun. 29, 2017.

International Search Report issued Oct. 15, 2020 in International Application No. PCT/KR2020/001692.

Office Action issued Sep. 13, 2022 in Japanese Application No. 2021-552641.

* cited by examiner

METHOD AND SYSTEM FOR TRAINING AUTONOMOUS DRIVING AGENT ON BASIS OF DEEP REINFORCEMENT LEARNING

CROSS-REFERENCE TO RELATED APPLICATIONS

This U.S. non-provisional application is a continuation of PCT International Application No. PCT/KR2020/001692, which has an International filing date of Feb. 6, 2020, and which claims priority to Korean Patent Application No. 10-2019-0025284, filed Mar. 5, 2019, the entire contents of each of which are incorporated herein by reference in their entirety.

TECHNICAL FIELD

One or more example embodiments of the following description relate to a method and system for training an autonomous driving agent based on a deep reinforcement learning.

BACKGROUND

Currently, an increasing number of mobile robots are being deployed in living spaces. Mobile robots may provide services such as delivery services, surveillance services, and/or guidance services. To provide such services, safe autonomous driving in a complex and crowded environment is essential.

Many mobile robot autonomous driving methods include a global planner and a local planner/control policy. The global planner generates a trajectory and/or waypoints using a global structure of the whole environment. The local planner and/or the control policy follows a global plan while avoiding collisions with sometimes unexpected and dynamic obstacles such as pedestrians.

In the case of the local planner (or the control policy), approaches such as artificial potential fields and dynamic window approaches are widely used. However, many of such rule-based algorithms are known to suffer from issues such as being stuck in local minima or excessive dependency on an accurate map and a lack of generalization across various environments.

To overcome the issues, proposed are deep reinforcement learning (DRL)-based control approaches. Such approaches may learn optimal parameters that directly map a sensor input to a robot velocity through interaction with an environment. Although deep reinforcement learning approaches demonstrate promising results, the existing methods consider only statistical and simulated environments or require a wide field of view (FOV). Accordingly, a high-cost light detection and ranging ("LIDAR") device needs to be used.

OBJECT

Example embodiments provide an agent training method and system that may directly extract information that is difficult to obtain in the real world, but useful for learning in a simulation state and may provide the information to a value network between a policy network and the value network of an actor-critic algorithm on a simulation for a deep reinforcement learning (DRL), such that the value network used for learning may more accurately evaluate a value of an action of an agent, thereby improving performance of the policy network.

Example embodiments also provide an agent training method and system that allow an agent to obtain information about an environment outside a current field of view (FOV) based on a previous sensor value stored in a recurrent neural network using a memory of the recurrent neural network such as a Long-Short Term Memory (LSTM), such that even an agent with a limited FOV may autonomously drive in a more effective manner.

Solution

According to an aspect of at least one example embodiment, there is provided an agent training method of a computer apparatus including at least one processor, the agent training method including training, by the at least one processor, an agent through an actor-critic algorithm on a simulation for deep reinforcement learning (DRL). The training includes inputting first information to an actor network to determine an action of the agent and inputting second information to a critic to evaluate how helpful the action is to maximizing a reward in the actor-critic algorithm, and the second information including the first information and additional information.

According to an aspect of at least one example embodiment, there is provided a computer program stored in a computer-readable record medium to implement the method on a computer apparatus in conjunction with the computer apparatus.

According to an aspect of at least one example embodiment, there is provided a computer-readable record medium storing a computer program to implement the method on a computer apparatus.

According to an aspect of at least one example embodiment, there is provided a mobile robot platform equipped with an agent trained through the method.

According to an aspect of at least one example embodiment, there is provided a computer apparatus including at least one processor is configured to execute computer-readable instructions. The at least one processor is configured to train an agent through an actor-critic algorithm on a simulation for deep reinforcement learning (DRL), in order to train the agent. The training of the agent includes inputting first information to an actor network to determine an action of the agent, and inputting second information to a critic to evaluate how helpful the action is to maximizing a reward in the actor-critic algorithm, the second information comprising the first information and additional information.

Effect

According to some example embodiments, it is possible to directly extract information that is difficult to obtain in the real world, but useful for learning in a simulation state and to provide the information to a value network between a policy network and the value network of an actor-critic algorithm on a simulation for a deep reinforcement learning (DRL), such that the value network used for learning may more accurately evaluate a value of an action of an agent, thereby improving performance of the policy network.

According to some example embodiments, it is possible to allow an agent to obtain information about an environment outside a current field of view (FOV) based on a previous sensor value stored in a recurrent neural network using a memory of the recurrent neural network such as a Long-Short Term Memory (LSTM), such that even an agent with a limited FOV may autonomously drive in a more effective manner.

DETAILED DESCRIPTION

Hereinafter, some example embodiments are described with reference to the accompanying drawings.

For autonomous driving ability in mobile robots, a deep reinforcement learning (DRL)-based method is receiving increasing attention. However, existing DRL methods require a wide field of view (FOV) and need to use a high-cost light detection and ranging ("LiDAR" and/or "LIDAR") device accordingly. Herein, a probability of replacing the high-cost LIDAR device with a relatively low-cost depth camera (e.g., with a limited FOV) is reviewed. First, an effect of a limited FOV in a DRL agent is analyzed herein. Second, proposed is a Long-Short Term Memory (LSTM) agent with a local-map critic (LSTM-LMC) that is a novel DRL method for learning efficient autonomous driving in a complex environment with a limited FOV. Lastly, herein, a dynamics randomization method is introduced to improve robustness of a DRL agent in the real world. Herein, the present specification demonstrates that a method using a limited FOV may outperform a method using a wide FOV but a limited memory, and also provides empirical evidence that the proposed method learns to implicitly model a surrounding environment and dynamics of other agents. Also, the present specification demonstrates that a robot with a single depth camera may autonomously drive through the complex real world using the method according to example embodiments.

Figure 1:
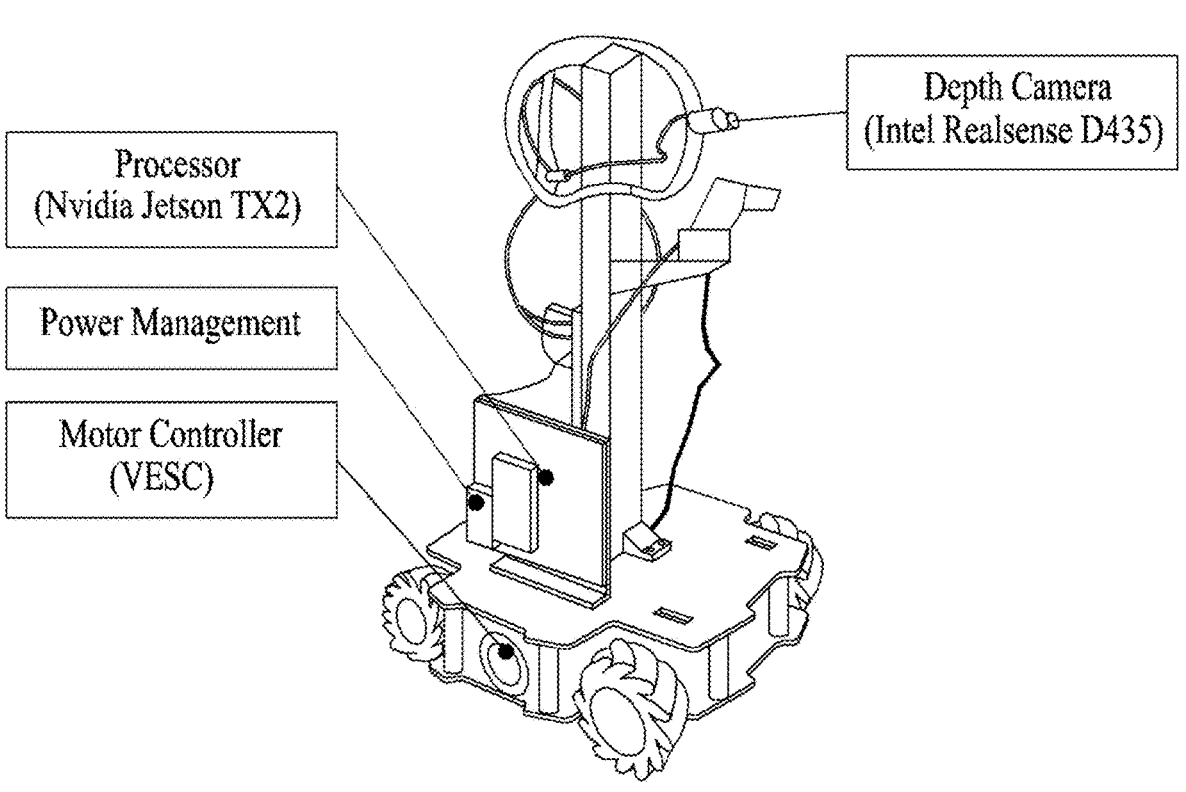
FIG. 1 illustrates an example of a mobile robot platform according to some example embodiments.

FIG. 1 illustrates an example mobile robot platform according to some example embodiments. The mobile robot platform comprises an example of a mounted camera with a limited FOV (e.g., an Intel RealSense D435 depth camera with a FOV of 90°) and a processor (e.g., a NVIDIA Jetson TX2). The example embodiments are not so limited.

1. Related Studies

A. A DRL Method for Autonomous Driving of a Mobile Robot

Conventional approaches for autonomous driving of a mobile robot depend on human-engineered parameters and rules. The human-engineered parameters and rules may be specific to the environments and/or conditions. Thus, conventional approaches for autonomous driving of a mobile robot often fail in complex and/or dynamic environments due to problems related to the interaction between the engineered parameters and the environment, such as sensitivity to hyper parameters and/or local minima.

Deep reinforcement learning (DRL)-based approaches are widely studied to overcome the above problems. In such DRL-based approaches, an agent may learn a method of directly mapping a sensor input to a robot velocity from data that is collected through interaction with an environment. For example, the agent may include a processor (e.g., an embedded AI computing device such as the Nvidia Jetson TX2 and/or the like) configured to train and/or operation a DRL-based operation. In some of these cases, a DRL agent may be capable of autonomously driving through a complex indoor environment using red, green, blue, and depth ("RGB-D") images. Although these cases have shown remarkable results in simulation experiments, the DRL agents using RBG-D images are difficult to be deployed in the real world due to a great difference between RGB-D scenes in various environments and a lack of ability to avoid dynamic obstacles. A more realistic solution proposes a socially aware collision avoidance method which can demonstrate a robust performance in the real world, but which requires the explicit measuring of positions and velocities of other agents and/or obstacles (e.g., pedestrians).

In these examples, some of the socially aware collision avoidance methods use raw LIDAR to measure the positions and velocities of other agents and/or obstacles. In these examples, which use raw LIDAR data, a DRL agent may combine a probabilistic road map and DRL to enable long-range autonomous driving across the overall complex environment. However, these examples often only consider static obstacles and/or obstacles with a fixed velocity and/or trajectory, making using such socially aware collision avoidance methods in a complex real-world environment difficult. Meanwhile, in some examples, a DRL agent capable of learning to autonomously drive in a crowded environment are proposed. These agents may be successfully deployed in the real world, but require expensive LIDAR equipment to maintain a wide FOV (e.g., 180° to 220°).

The example embodiments disclosed herein may use a low-cost depth camera with a limited FOV instead of using a high-cost LIDAR device.

B. Multi-Agent DRL

In a neural network architecture capable of learning an implicit communication protocol between a plurality of agents, agents demonstrate better performance compared to agents without communication or a centralized controller. However, the plurality of agents require direct messaging to one another, which is difficult, impractical, and/or impossible in a human-robot interaction scenario. However, a multi-agent deep deterministic policy gradient (MADDPG) method that provides information of other agents only to an agent and/or observer (herein referred to as a "critic") demonstrates that a cooperative action may appear without exchanging an explicit message in a test time, thereby opening up a probability of being applicable in a human-robot interaction situation such as autonomous driving in a crowded environment.

Example embodiment include an MADDPG approach which can further providing information about an environment as well as information about other agents to a critic.

C. Direct Deployment of a DRL Agent in the Real World Using Dynamics Randomization Although a DRL method achieved a great success in a game domain, deploying a DRL agent in robot tasks of the real world is considered to be more difficult due to a difference between the real world and a simulator. The difference significantly degrades the performance of agents when DRL agents are trained in the simulator and then deployed without fine tuning. To overcome this problem, dynamics randomization is used in the simulator. The dynamics randomization may improve robustness of an agent in real-world robot tasks, such as a locomotion of a quadruped robot or an object manipulation using a robot arm. In an example embodiment, an effect of dynamics randomization in autonomous driving tasks of a mobile robot is investigated by randomizing sensor noise, wheel drift, and a control frequency in simulation.

2. Approach

Hereinafter, after briefly covering a deep reinforcement learning (DRL) framework, an LSTM-LMC architecture according to some example embodiments is described. Thereafter, details about a training environment and a dynamics randomization technique according to some example embodiments are described.

A. Deep Reinforcement Learning (DRL)

Reinforcement learning may refer to a method in which a human does not directly generate a robot control algorithm and an artificial intelligence ("AI") agent learns a control method (e.g., for a robot). The AI agent can, for example, by train itself to maximize a reward specified by a developer through direct interaction in and/or with an environment (e.g., in a simulation and/or in the real world). In the case of DRL, the model may perform the reinforcement learning using a deep neural network (DNN). However, the model may use a variety of learning models, such as, deconvolutional neural networks, recurrent neural networks (RNN), gated recurrent units (GRU), stacked neural networks (SNN), state-space dynamic neural networks (SSDNN), deep belief networks (DBN), generative adversarial networks (GANs), and/or restricted Boltzmann machines (RBM). Alternatively and/or additionally, such models may include other forms of machine learning models, such as, for example, linear and/or logistic regression, statistical clustering, Bayesian classification, decision trees, dimensionality reduction such as principal component analysis, and expert systems; and/or combinations thereof, including ensembles such as random forests.

Due to partial observability caused by a limited FOV and uncertainty about states of other agents, an environment may be modeled as a partially observed Markov decision process (POMDP). For example, the POMDP may include six (6) tuples (S, A, P, R, Ω, and O). Here, S denotes a state space, A denotes an action space, P denotes a transition probability, R denotes a reward function, Ω denotes an observation space, and O denotes an observation probability.

The goal of the reinforcement learning may be, for example, to learn a policy of an agent $\pi(a, o)=p(a|o)$ that maximizes a discounted return G of the following Equation 1.

$$G = \sum_{t=0}^{\infty} \gamma^t \mathbb{E}[r(s_t, a_t)] \qquad \text{[Equation 1]}$$

In Equation 1, $\gamma \in [0,1]$ denotes a discount factor for a future reward.

Currently, DNN is used to learn policy parameters or value functions of a reinforcement learning agent. The example embodiments may use a soft actor-critic (SAC) algorithm that jointly maximizes entropy of a probabilistic policy with the return G, as given by the following Equation 2.

$$G = \sum_{t=0}^{\infty} \gamma^t \mathbb{E}[r(s_t, a_t) + \alpha H(\pi(\cdot \mid s_t))] \qquad \text{[Equation 2]}$$

The SAC algorithm may be selected for robustness to hyper parameters, sample efficient learning in a continuous working space, and a desirable exploration property.

B. Problem Setting

1) Observation space: For observation o of an agent, sliced point clouds, similar to LIDAR data, having various horizontal FOVs (90°, 120°, and 180°) are used. Initially, a point cloud may be calculated from a depth image, and a length may be reduced by horizontally truncating the point cloud and removing a floor and a ceiling. Then, vectors ($\mathbb{R}^{18}$, $\mathbb{R}^{24}$, $\mathbb{R}^{36}$) are generated by vertically and uniformly slicing the truncated point cloud at intervals (e.g., of 5°) and by selecting a distance from a nearest point in each segment. The vectors are referred to as "depth scan" hereinafter.

Also, $\mathbb{R}^2$ vectors, representing current linear and angular velocities of an agent, may be used. In these cases, the angular velocities may be normalized to the range $[-1,1]$.

Also, $\mathbb{R}^{15}$ vectors, representing relative distances and angles of the following five (5) waypoints, may be used in a form of $[r_1, \sin(\theta_1), \cos(\theta_1), r_2, \ldots, \cos(\theta_5)]$ in which $r_i$ denotes a distance from an $i^{th}$ waypoint and $\theta_i$ denotes an angle in a polar coordinate.

2) Action space: For an action a of an agent, $\mathbb{R}^2$ vectors are used to obtain linear and angular velocities. The linear velocity of the agent is in the range of $[0, 1]$ m/s and the angular velocity is in the range of $[-90, 90]$ °/s. The normalized velocities in the range of $[-1,1]$ may be used as an output of a neural network.

3) Reward function: Reward r may include five terms as given by the following Equation 3.

$$r = r_{base} + r_{collision} + r_{waypoint} + r_{rotation} + r_{safety} \qquad \text{[Equation 3]}$$

$r_{base}$ may be a small negative base reward that is given at every timestep to encourage agents to follow a shortest path. In some examples the negative base reward may be set such that $r_{base} = 0.05$.

$r_{collision}$ may be a collision reward that imposes a penalty to agents when the agents collide with a wall or other agents. In some examples, the collision reward may be set such that $r_{collision} = -20$.

$r_{waypoint}$ may be given to an agent when a distance between the agent and a next waypoint is less than 1 meter (m). In some examples, the $r_{waypoint}$ may be given as a value of three (3). For a final waypoint (goal), a threshold may be set to 0.6 m.

$r_{rotation}$ may be a penalty for a large angular velocity and may be defined as the following Equation 4.

$$r_{rotation} = \begin{cases} -0.15 * |w| & \text{if } \pi/4 \leq |w| \\ 0 & \text{else} \end{cases} \qquad \text{[Equation4]}$$

In Equation 4, w denotes the angular velocity of the agent in radian.

$r_{safety}$ may be a small penalty to encourage agents to avoid obstacles as proactive as possible and may be defined as the following Equation 5.

$$r_{safety} = \min_{o_i \in Obs}(-0.15 * (\text{score}_x(o_i) + \text{score}_y(o_i))) \qquad \text{[Equation 5]}$$

In Equation 5, Obs denotes a set of all obstacles in an environment including other agents. $\text{score}_x$ and $\text{score}_y$ may be defined as Equation 6 and Equation 7, respectively.

$$score_x(o_i) = \begin{cases} \max(0, 1 - d_x/3) & \text{if } 0 \le d_x \\ \max(0, 1 + d_x/0.3) & \text{if } d_x < 0 \end{cases} \quad \text{[Equation 6]}$$

$$score_y(o_i) = \max(0, 1 - |d_y|) \quad \text{[Equation 7]}$$

Here, $d_x$ and $d_y$ denote relative displacements between an agent and $o_i$ in x axis and y axis.

C. LSTM-LMC

Figure 2:
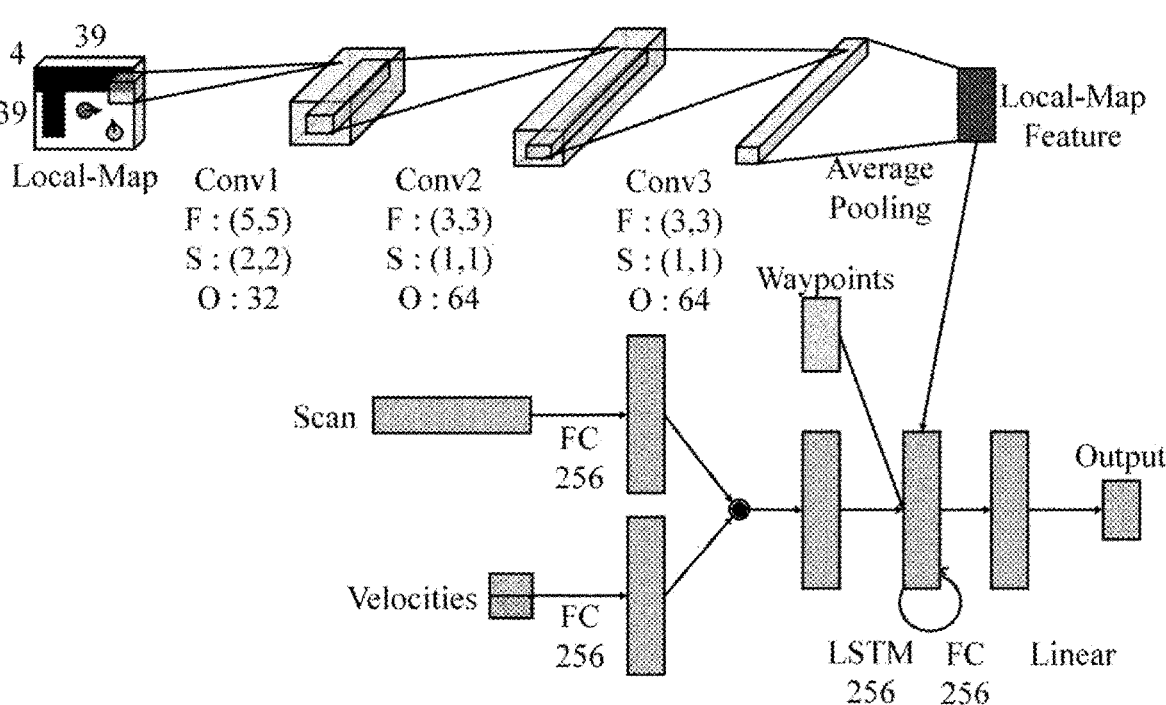
FIG. 2 illustrates an example of a Long-Short Term Memory (LSTM)-local-map critic (LMC) architecture according to some example embodiments.

A limited FOV imposes heavy partial observability to a DRL agent. The partial observability makes it difficult to estimate an accurate state-action value, which may lead to suboptimal decision making. To overcome such partial observability, LSTM-LMC, e.g., according to the example embodiments, may be used. FIG. 2 illustrates an example of an LSTM-LMC according to some example embodiments.

In a convolutional layer, "F" denotes a filter size, "S" denotes a stride, and "O" denotes an output channel. The same architecture may be used in an actor network, a Q network, and/or a V network. The actor network may refer to an evaluation network that determines an action of an artificial intelligence agent; the Q network may refer to an evaluation network that determines an action for a critic; and the V network may refer to a value network that evaluates how helpful a corresponding action is to maximize a reward. A local-map branch for providing a local-map feature is not used in the actor network.

1) LSTM agent: A recurrent neural network may refer to a deep learning model configured to learn based on data that varies over time, such as time-series data, and may be an artificial neural network configured by connecting a network at a reference point in time (t) and a subsequent point in time (t+1). However, if a deep neural network (DNN) is connected at every point in time, learning becomes difficult due to a vanishing gradient problem. An LSTM-typed recurrent neural network is a representative model to overcome the above problem. By using the LSTM as above, a memory ability may be given to an agent. As analyzed in a subsequent section of Experiments, a memory may play an important role in collision avoidance by implicitly building representation of a surrounding environment and dynamics of moving obstacles. LSTM alone may significantly improve performance of the agent with a limited FOV in the experiments. An LSTM (and LSTM-LMC) agent may be trained by sampling 200-step trajectories from experience replay. Trajectories may be sampled at a random point of an episode and a state of the LSTM may be set to "0" at the beginning of each trajectory.

2) Local-map critic (LMC): If additional information, such as actions of other agents, is included in a critic the performance in multi-agent DRL may be improved. However, in this case, an actor does not require additional information and the critic is usually not used after training is complete. This approach may be extended by simply giving the critic a 2D local map of a surrounding area instead of actions of other agents. Therefore, agents trained with this approach may be deployed without using expensive additional information. A local map M may cover an area (e.g., 10 m×10 m) around the agent. In this case, a tensor with a size of (39×39×4) and a value of $M_{i,j,k}$ may be defined as the following Equation 8.

$$M_{i,j,0} = \begin{cases} 1 & \text{if } M_{i,j} \text{ is movable} \\ 0 & \text{if } M_{i,j} \text{ is obstacle} \\ 0.33 & \text{if } M_{i,j} \text{ is other agent} \\ 0.66 & \text{if } M_{i,j} \text{ is self} \end{cases} \quad \text{[Equation 8]}$$

If $M_{i,j}$ represents an agent, $M_{i,j,1:3}$ may encode normalized heading, linear velocity, and angular velocity.

3) Network architecture: A network architecture of an LSTM-LMC model is illustrated in FIG. 2. Initially, an observation feature may be obtained by projecting a depth scan and velocities onto vectors of the same size using fully connected layers and by applying an elementwise product to these two vectors. In the critic (Q network and V network), a local-map tensor may implement a local-map feature by passing through three convolutional layers and by applying global average pooling. Then, concatenation of the observation feature, the local-map feature, and waypoints may be used as an input for LSTM. An output of an LSTM layer may pass through a fully connected layer, followed by a policy output layer or a value output layer. The local-map feature is not used in an actor and LSTM of the Q network may have an additional action input. For policy output, Gaussian policy with a hyperbolic tanh squashing function may be used.

Figure 3:
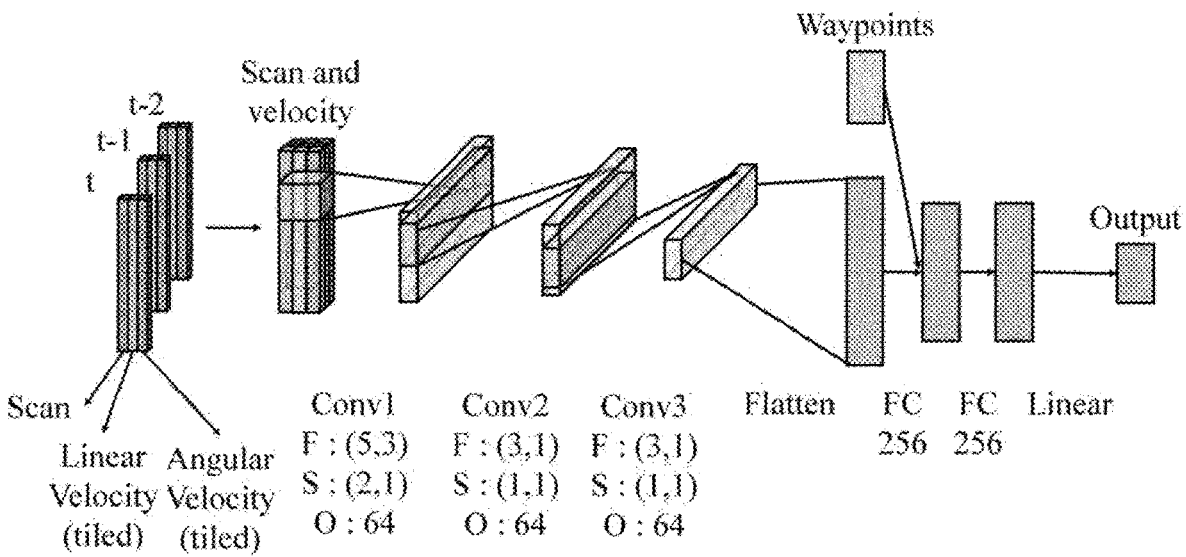
FIG. 3 illustrates an example of a convolutional neural network (CNN)-based memoryless model according to a comparative example.

Also, for comparative experiments, CNN-based memoryless models with FOVs of 90°, 120°, and 180° are implemented. FIG. 3 illustrates an example of a CNN-based memoryless model according to the comparative examples. In the case of a CNN model, when $d_{scan}$ denotes a size of a depth scan vector, velocity vectors $\mathbb{R}^2$ may be tiled to match a shape of depth scan vectors $\mathbb{R}^{d_{scan} \times 2}$. Then, the tiled vector may be concatenated to a depth scan vector $\mathbb{R}^{d_{scan} \times 1}$, which may result in a matrix with a size of $\mathbb{R}^{d_{scan} \times 3}$. To obtain a single network input tensor $\mathbb{R}^{d_{scan} \times 3 \times 3}$, matrices may be stacked in 3 recent timesteps. This tensor may pass through three convolutional layers and be flattened to obtain an observation feature. Then, the observation feature may be concatenated to the waypoints and may pass through two fully connected layers, followed by an output layer.

D. SUNCG 2D Simulator and Dynamics Randomization

Figure 4:
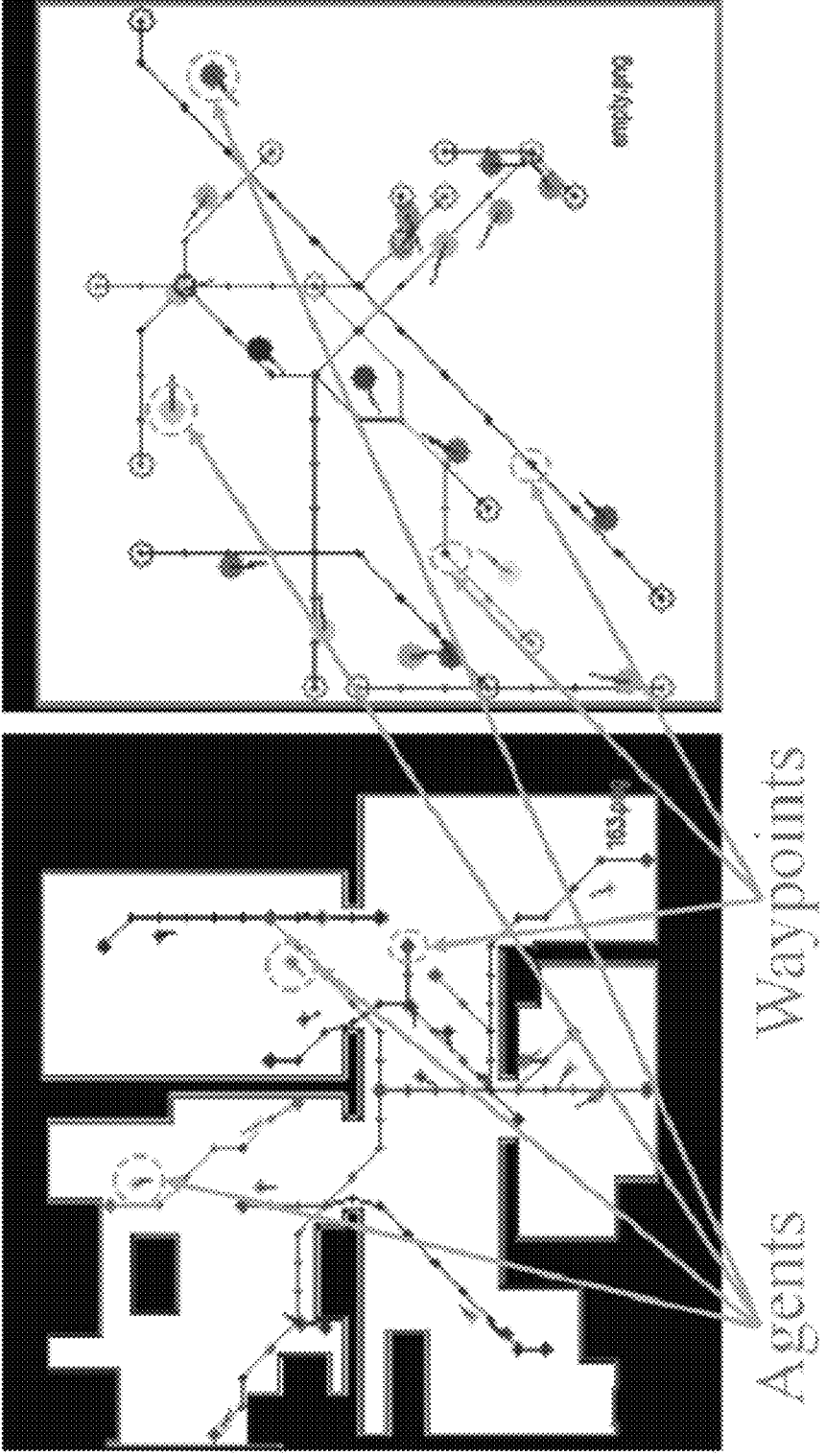
FIG. 4 illustrates an example of a SUNCG 2D simulator according to some example embodiments.

1) SUNCG 2D Environment: A two-dimensional (2D) multi-agent autonomous driving simulator is implemented for experiments according to some example embodiments. FIG. 4 illustrates an example of a SUNCG 2D simulator according to some example embodiments. In FIG. 4, a black area represents an obstacle, circles represent an agent (robot), and lines represent plans of a global planner. FIG. 4 illustrates an example of starting an episode at a probability of 0.33 (right) on an empty map. A thousand (1000) random floor plans may be extracted from a SUNCG dataset and 75 maps may be manually selected as learning environments.

2) Training scenarios: In each training episode, a random environment among the 75 maps in the dataset may be sampled. Early experiments found that avoiding a moving obstacle is more difficult than avoiding a static obstacle. Therefore, a small empty map that has only moving obstacles (on the right of FIG. 4) may be selected with the probability of 0.33 to improve the ability to avoid moving obstacles. Once the map is selected, a maximum of 20 agents may be deployed at random positions and random goal positions may be assigned to the agents. Then, the environment may be displayed as a grid of (1 m×1 m) cells and waypoints for each agent may be extracted using Dijkstra algorithm. For each agent, the episode is set to end when colliding with an obstacle or when 1000 timesteps pass. When an agent reaches its goal, a new random goal and waypoints are assigned to the agent.

3) Dynamics randomization: Dynamics and observation in the real world differ from those in the simulator. Also, the dynamics and observation in the real world are highly noisy. The difference and noise make agents trained in the simulator often fail in performing well in the real world. To overcome this problem, the observation and dynamics of the simulator are randomized to improve the robustness of a learned policy.

Mobile robot autonomous driving may also benefit from this randomization technology. The following randomization may apply to the simulator. Since real-world noise a mobile robot may encounter is usually inconsistent in a single episode, noise may be resampled at every timestep.

Scan noise: It is known that real world scan data is often noisier than data from the simulator and a depth image is noisier than LIDAR data. Therefore, a scan noise compensation ($N(0, 0.1)$) is added to every depth scan value.

Velocity randomization: In the real world, a robot does not move at the same velocity as an input due to limitations in physics such as wheel drift, an error of a motor controller, and/or a friction. To cope with this, an input velocity may be multiplied by $N(1, 0.1)$ before applying the input velocity to the robot. Also, since a motor in the real world cannot immediately change its velocity, a velocity of an agent at timestep t may be set to $\overline{v}_t = 0.8 v_t + 0.2 \overline{v}_{t-1}$. Here, $v_t$ denotes a value obtained by multiplying a command from the agent by noise and $\overline{v}_t$ denotes an actual velocity that is applied to the robot.

Timescale randomization: In the simulator, 1 timestep may be set to 0.15 seconds. However, in the real-world hardware, an exact control frequency may not be expected. This may be disadvantageous for mobile robot autonomous driving since timescale noise may cause errors in the estimation of a moving object's dynamics including the robot itself. To overcome this, $N(0, 0.05)$ seconds may be added to every timestep in the simulator.

It may be assumed that observation and dynamics noise of the real world have a greater effect on an LSTM-LMC agent than a CNN agent. This is because the LSTM-LMC agent considers a longer history to accumulate errors from noise. The effect of the above randomization is discussed in detail in the following section of Experiments.

3. Experiments

Five types of agents (a CNN agent with FOVs of 90°, 120°, and 180°, an LSTM agent with a FOV of 90°, and an LSTM-LMC agent with a FOV of 90°) were trained with the hyper parameters listed in Table 1.

TABLE 1

| Hyper parameter | Value |
| --- | --- |
| $\alpha$ in Equation 2 | 0.02 |
| Mini-batch size | 256 |
| Trajectory sample length | 200 |
| Size of experience replay | 5,000,000 |
| Training iteration | 3,000,000 |
| Discount factor $\gamma$ | 0.99 |
| Learning rate | 3e-4 |
| LSTM unroll | 20 |
| Target network update ratio | 0.01 |
| Activation functions | LeakyReLU |

Each agent was trained for 3 million environment steps.

A. Performance

Trained agents were evaluated in 100 evaluation episodes. Random seeds for evaluation sessions were fixed to evaluate all the agents on the same map with the same start positions and initial goal positions. Evaluation results may be summarized in the following Table 2.

TABLE 2

| Architecture | CNN | CNN | CNN | LSTM | LSTM-LMC (proposed) |
| --- | --- | --- | --- | --- | --- |
| FOV | 90° | 120° | 180° | 90° | 90° |
| Mean number of passed waypoints | 29.73 | 40.62 | 51.45 | 42.96 | 53.64 |
| Mean number of passed goals | 1.42 | 2.22 | 3.47 | 3.06 | 3.63 |
| Survival rate until episode ends | 13.53% | 19.90% | 27.67% | 35.80% | 26.90% |

Table 2 shows performance of agents having various FOVs and architectures. Referring to Table 2, the performance of the CNN (memoryless) agent rapidly drops as the FOV decreases. On the contrary, the LSTM-LMC agent with the FOV of 90° outperformed all other agents, even the CNN agent with the FOV of 180° in terms of a number of passed waypoints/goals. The LSTM agent outperformed the CNN agent with the FOV of 120°, however, failed to outperform the agent with the FOV of 180°. However, the LSTM agent showed a highest survival rate until episode ends.

B. Analysis.

That the proposed method shows a superior performance over other methods may be hypothesized since the proposed method implicitly builds a robust and accurate model for a surrounding environment and dynamics of other agents. Hereinafter, the hypothesis is verified by analyzing an action of an agent trained in the following controlled scenarios.

Figure 5:
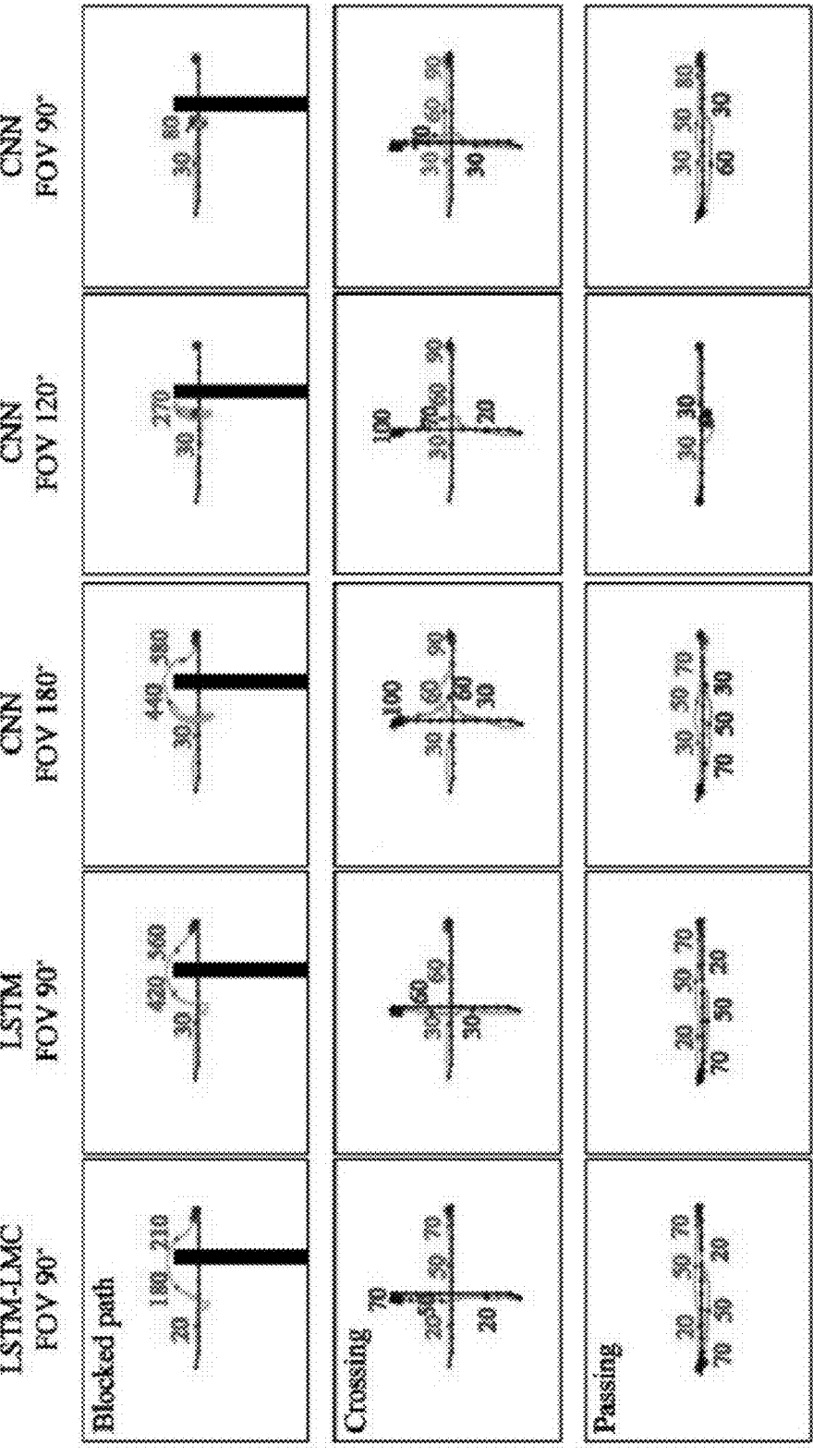
FIG. 5 illustrates an example of analysis scenarios according to some example embodiments.

FIG. 5 illustrates an example of analysis scenarios according to some example embodiments. Referring to FIG. 5, a top portion represents a blocked path scenario in which a path is blocked due to an unexpected wall on the path, a middle portion represents a crossing scenario that moves vertically crossing other agents, and a bottom portion represents an example of movement of agents according to a passing scenario to avoid oncoming other agents. Dark lines represent paths from a global planner, bright lines represent trajectories of agents, and numbers represent timesteps. Here, the LSTM-LMC agent with the FOV of 90° according to some example embodiments show a superior performance in bypassing a wall and symmetry breaking between agents.

1) Blocked path scenario: The "Blocked path scenario" was designed to ensure that the proposed agent memorizes a structure of an environment. The top portion of FIG. 5 represents the blocked path scenario. In the blocked path scenario, a path from a global planner is blocked by a wall. The wall has a randomly positioned slit on a top side or a bottom side of the wall such that the agent needs to explore to find which side is open while remembering that the original path is blocked. As shown in the following Table 3, for 50 episodes, the LSTM-LMC agent with the FOV of 90° according to some example embodiments achieved a highest success rate.

TABLE 3

| | | CNN FOV 90° | CNN FOV 120° | CNN FOV 180° | LSTM FOV 90° | LSTM-LMC FOV 90° |
|---|---|---|---|---|---|---|
| Blocked path | Success rate | 0% | 16% | 82% | 78% | 92% |
| Crossing | Success rate | 78% | 92% | 96% | 100% | 100% |
| Passing | Success rate | 100% | 98% | 100% | 100% | 100% |

Qualitatively, the LSTM-LMC agent with the FOV of 90° efficiently explored both sides of the wall and did not return to the original path when the blocked original path went outside of its FOV. On the contrary, the CNN agents tried to return to their original path as soon as the blocked original path went outside of their FOVs. The LSTM agent was able to pass the blocked path, however, did not outperform the best CNN agent (CNN agent with the FOV of 180°).

2) Crossing & passing scenarios: To verify the effect of a memory and a local-map critic in modeling dynamics of moving obstacle, "Crossing" (middle portion of FIG. 5) and "Passing" (bottom portion of FIG. 5) experiments were conducted. Two agents pursue orthogonal paths (one agent platform may be equipped with an agent trained, e.g., by a training method according to the example embodiments.

2) Effect of dynamics randomization in simulator: The CNN and the LSTM-LMC agents were deployed with or without randomized training in a real-world indoor environment. The environment is quite difficult for the agents with a limited FOV since the environment has narrow corridors, many curves, and complex obstacles such as stairs and thin pillars. Also, noisy localization may negatively affect stable autonomous driving. Three experiments were conducted for each agent and the results are shown in the following Table 4.

TABLE 4

| | CNN, FOV 90° No randomization | | | CNN, FOV 90° Randomization | | | LSTM-LMC, FOV 90° No randomization | | | LSTM-LMC, FOV 90° Randomization | | |
|---|---|---|---|---|---|---|---|---|---|---|---|---|
| Trial | 1 | 2 | 3 | 1 | 2 | 3 | 1 | 2 | 3 | 1 | 2 | 3 |
| Passed Waypoints | 20 | 51 | 55 (all) | 24 | 23 | 55 (all) | 55 (all) | 44 | 24 | 55 (all) | 55 (all) | 51 |
| Elapsed Time | — | — | 63.969 | — | — | 59.711 | 64.093 | — | — | 49.493 | 50.391 | — | is randomly positioned on a top side or a bottom side) in the crossing scenario, and the agents follow the same paths but in opposite directions in the passing scenario. The agents need to model a future path of the other agent to break symmetry in both scenarios. Each scenario was conducted 50 times for each agent and the results are summarized in the above Table 3. The LSTM-LMC agent and the LSTM agent achieved a highest success rate in the crossing scenario and all the agents performed well in the passing scenario in terms of a success rate. However, qualitatively, the CNN agent often failed in breaking the symmetry in both (crossing and passing) scenarios as shown in the middle portion and the bottom portion of FIG. 5. In contrast, the LSTM-LMC agent with the FOV of 90° according to an example embodiment demonstrated the stable symmetry breaking in all the episodes.

C. Hardware Experiments

The hardware experiments were conducted to verify performance of an agent training method according to an example embodiment in the real world.

1) Hardware setup: As described above with reference to FIG. 1, the mobile robot platform with four wheels was built. In this example, the mobile robot platform is equipped with NVIDIA Jetson TX-2 as a main processor and one Intel RealSense D435 RGB-D camera with a FOV of 90°; however the example embodiments are not limited thereto. In the experiments, Apriltag and wheel odometer were used for localization. However, other methods, such as a global positioning system (GPS), an ultrawideband, and/or visual localization, may be used for localization. The mobile robot Both the CNN agents with or without randomization have poor performance, colliding with obstacles in an early stage of an episode. Also, the CNN agents did not demonstrate any meaningful benefits from dynamics randomization. Meanwhile, as expected, the LSTM-LMC agent without dynamics randomization suffered more from real-world noise. Noise causes a collision and/or slow autonomous driving while showing unstable movement. The LSTM-LMC agent with dynamics randomization was the only agent that demonstrated the stable performance.

3) Autonomous driving in a crowded real-world environment: To verify overall performance of an agent training method according to some example embodiment in a real-world environment, the LSTM-LMC agent with dynamics randomization was deployed in the crowded environment. The robot repeated a straight route of 7 m and two participants crossed, passed, or interrupted the path of the robot. The robot was able to complete 12 successive routes (about 84 m) even under obstruction.

Figure 6:
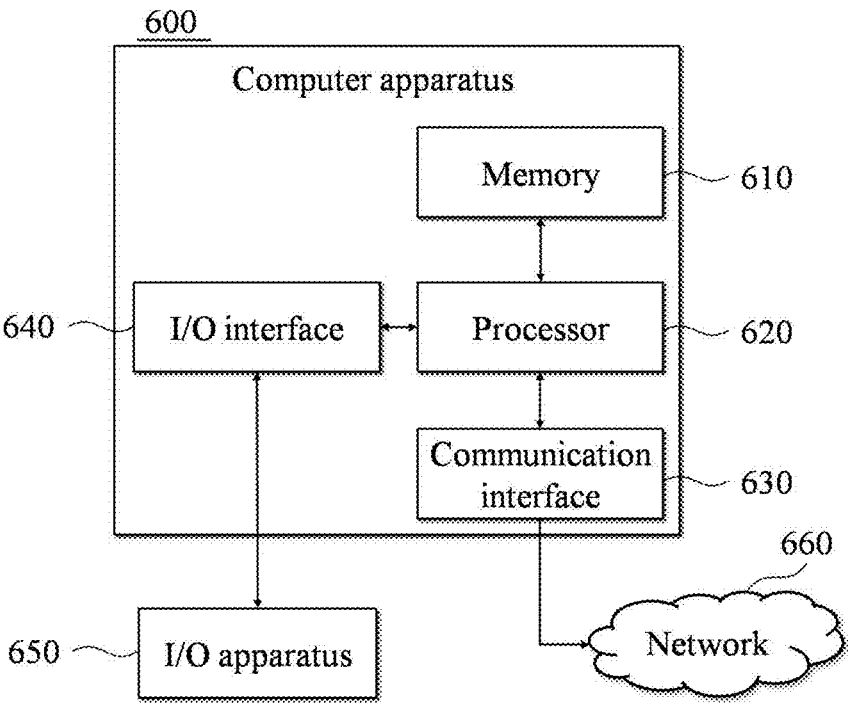
FIG. 6 is a block diagram illustrating an example of a computer apparatus according to some example embodiments.

FIG. 6 is a block diagram illustrating an example of a computer apparatus according to some example embodiments. For example, the agent training method according to some example embodiments may be performed by a computer apparatus 600 of FIG. 6. Referring to FIG. 6, the computer apparatus 600 may include a memory 610, a processor 620, a communication interface 630, and an input/output (I/O) interface 640. The memory 610 may include a permanent mass storage device, such as a random access memory (RAM), a read only memory (ROM), and a disk drive, as a computer-readable record medium. In some embodiments, the permanent mass storage device, such as ROM and disk drive, may be included in the computer apparatus 600 as a permanent storage device separate from the memory 610. Also, an OS and at least one program code may be stored in the memory 610. Such software components may be loaded to the memory 610 from another computer-readable record medium separate from the memory 610. The other computer-readable record medium may include a computer-readable record medium, for example, a floppy drive, a disk, a tape, a DVD/CD-ROM drive, a memory card, etc. According to other example embodiments, software components may be loaded to the memory 610 through the communication interface 630, instead of the computer-readable record medium. For example, the software components may be loaded to the memory 610 based on a computer program installed by files provided over a network 660.

The processor 620 may be configured to process instructions of a computer program by performing basic arithmetic operations, logic operations, and I/O operations. The instructions may be provided from the memory 610 and/or the communication interface 630 to the processor 620. For example, the processor 620 may be configured to execute received instructions in response to the program code stored in the storage device, such as the memory 610.

The communication interface 630 may provide a function for communication between the computer apparatus 600 and other apparatuses, for example, the aforementioned storage devices, over the network 660. For example, the processor 620 of the computer apparatus 600 may transfer a request and/or instruction created based on a program code stored in the storage device such as the memory 610, data, a file, etc., to the other apparatuses over the network 660 under control of the communication interface 630. Inversely, a signal, an instruction, data, a file, etc., from another apparatus may be received at the computer apparatus 600 through the communication interface 630 of the computer apparatus 600. For example, a signal, an instruction, data, etc., received through the communication interface 630 may be transferred to the processor 620 or the memory 610, and a file, etc., may be stored in a storage medium, for example, the permanent storage device, further includable in the computer apparatus 600.

The I/O interface 640 may be a device used for interface with an I/O apparatus 650. For example, an input device may include a device, such as a microphone, a keyboard, a camera, a mouse, etc., and an output device may include a device, such as a display, a speaker, etc. As another example, the I/O interface 640 may be a device for interface with an apparatus in which an input function and an output function are integrated into a single function, such as a touchscreen. The I/O apparatus 650 may be configured as a single apparatus with the computer apparatus 600.

Also, according to other example embodiments, the computer apparatus 600 may include a number of components less than or greater than the number of components of FIG. 6. For example, the computer apparatus 600 may be configured to include at least a portion of the I/O apparatus 650 or may further include other components, for example, a transceiver and a database.

The communication scheme is not particularly limited and may include a communication method using a near field communication between devices as well as a communication method using a communication network (e.g., a mobile communication network, the wired Internet, the wireless Internet, a broadcasting network, an internet of things (IoT) network, etc.) which may be included in the network 660.

For example, the network 660 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 660 may include at least one of network topologies that include a bus network, a star network, a ring network, a mesh network, a star-bus network, a tree or hierarchical network, and the like. However, it is provided as an example only and the example embodiments are not limited thereto.

Figure 7:
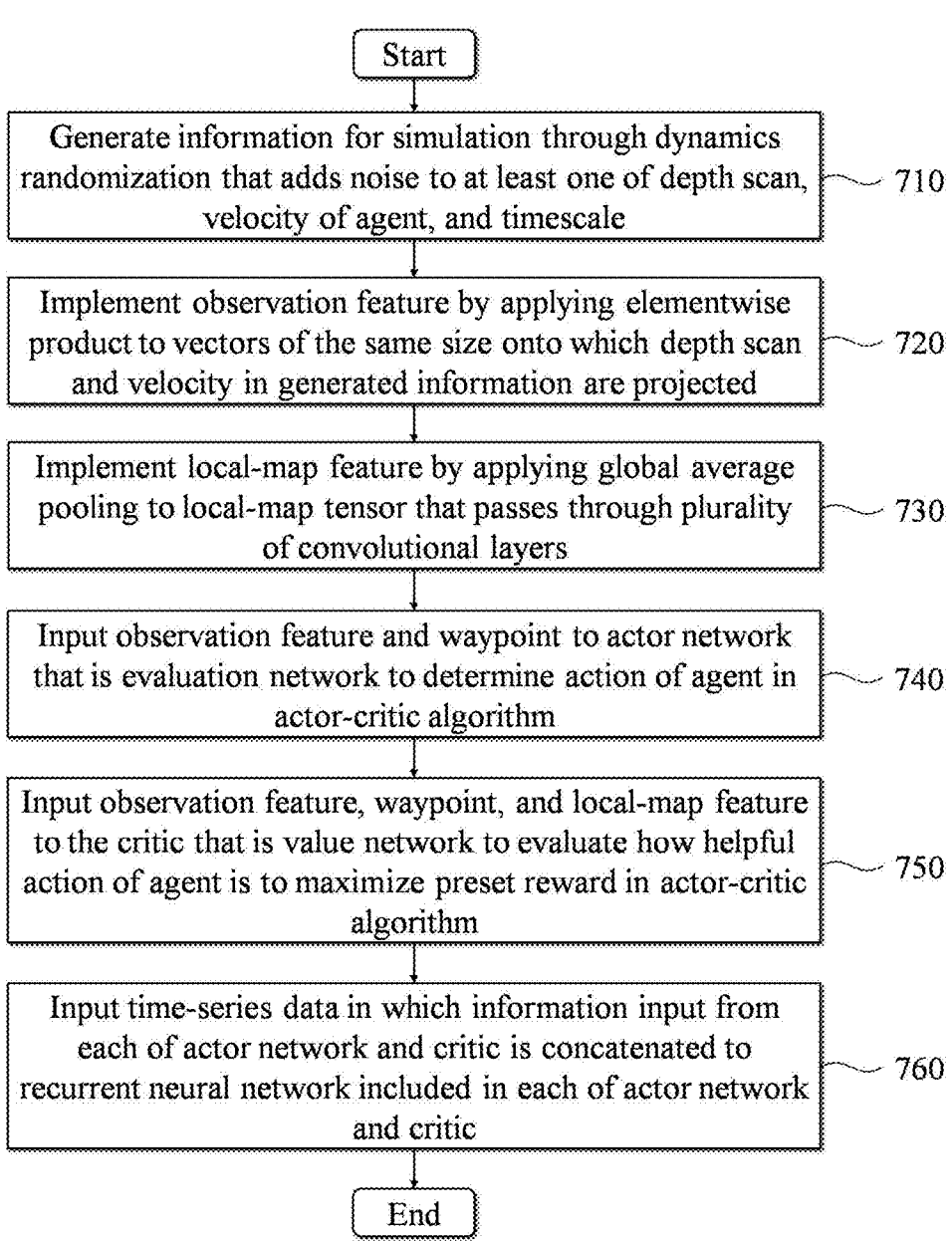
FIG. 7 is a flowchart illustrating an example of an agent training method according to some example embodiments.

FIG. 7 is a flowchart illustrating an example of an agent training method according to some example embodiments. The agent training method according to the example embodiments may be performed by the aforementioned computer apparatus 600. For example, the processor 620 of the computer apparatus 600 may be configured to execute a control instruction according to a code of at least one program and/or a code of an operating system (OS) included in the memory 620. Here, the processor 620 may control the computer apparatus 600 to perform operations 710 to 760 included in the method of FIG. 7 in response to the control instruction provided from the code stored in the computer apparatus 600.

The computer apparatus 600 may train an agent through an actor-critic algorithm on a simulation for DRL. For example, the computer apparatus 600 may input first information to an actor network that is an evaluation network to determine an action of an agent and may input second information to a critic that is a value network to evaluate how helpful the action of the agent is to maximize a preset reward in the actor-critic algorithm. Here, the second information may include the first information and additional information. As a detailed example embodiment for training the agent as above, the following operations 710 to 760 may be performed by the computer apparatus 600.

In operation 710, the computer apparatus 600 may generate information for simulation through dynamics randomization that adds noise to at least one of a depth scan, a velocity of an agent, and a timescale. Description related to the dynamics randomization is made above.

In operation 720, the computer apparatus 600 may implement an observation feature by applying an elementwise product to vectors of the same size onto which the depth scan and the velocity in the aforementioned information are projected.

In operation 730, the computer apparatus 600 may implement a local-map feature by applying global average pooling to a local-map tensor that passes through a plurality of convolutional layers.

In operation 740, the computer apparatus 600 may input the observation feature and a waypoint to the actor network that is the evaluation network to determine the action of the agent in the actor-critic algorithm. Here, the observation feature and the waypoint may correspond to the aforementioned first information.

In operation 750, the computer apparatus 600 may input the observation feature, the waypoint, and the local-map feature to the critic that is the value network to evaluate how helpful the action of the agent is to maximize the preset reward in the actor-critic algorithm. Here, the local-map feature may correspond to the aforementioned additional information. For example, the computer apparatus 600 may input, to the actor network, the observation feature and the waypoint as the first information and may input, to the critic, the observation feature and the waypoint as the first information and the local-map feature as the additional information.

Here, the local-map feature may be implemented by applying the global average pooling to the local-map tensor that passes through the plurality of convolutional layers. For example, the local-map feature may include information about at least one of an overall obstacle deployment situation, a velocity of a moving obstacle, and a goal of the moving obstacle. Also, the observation feature may be implemented by applying the elementwise product to vectors of the same size onto which the depth scan and the velocity are projected. The waypoint may be randomly set.

In operation 760, the computer apparatus 600 may input time-series data in which information input from each of the actor network and the critic is concatenated to a recurrent neural network included in each of the actor network and the critic. Here, the computer apparatus 600 may train the agent to obtain and operate information about an environment outside a current FOV based on a previous sensor value stored in the recurrent neural network. For example, the recurrent neural network may include an LSTM-typed recurrent neural network.

As described above, according to some example embodiments, it is possible to directly extract information that is difficult to obtain in the real world, but useful for learning in a simulation state and to provide the information to a value network between a policy network and the value network of an actor-critic algorithm on a simulation for a DRL, such that the value network used for learning may more accurately evaluate a value of an action of an agent, thereby improving performance of the policy network. Also, it is possible to allow an agent to obtain information about an environment outside a current FOV based on a previous sensor value stored in a recurrent neural network using a memory of the recurrent neural network such as LSTM, such that even an agent with a limited FOV may autonomously drive in a more effective manner.

The system or the apparatuses described herein may be implemented using hardware components, software components, and/or a combination thereof. For example, the apparatuses and the components described herein may be implemented using one or more general-purpose or special purpose computers, such as for example, a processor, a controller, an arithmetic logic unit (ALU), digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processor, and/or the processing device, may be and/or include a neuromorphic processor and/or embedded AI computing devices.

The software may include a computer program, a piece of code, an instruction, or some combination thereof, for independently or collectively instructing or configuring the processing device to operate as desired. Software and/or data may be embodied in any type of machine, component, physical equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable media. The media may include, alone or in combination with program instructions, data files, and data structures. The media may continuously store computer-executable programs or may transitorily store the same for execution or download. Also, the media may be various types of recording devices or storage devices in a form of one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of other media may include record media and storage media managed by an app store that distributes applications or a site that supplies and distributes other various types of software, a server, and the like. Examples of the program instructions include a machine code as produced by a compiler and a high-language code computer-executable using an interpreter.

While the example embodiments are described with reference to specific example embodiments and drawings, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, or replaced or supplemented by other components or their equivalents.

Therefore, other implementations, other example embodiments, and/or equivalents of the claims are to be construed as being included in the claims.

What is claimed is:

1. An agent training method for a computer apparatus comprising at least one processor, the agent training method comprising:

training, by the at least one processor, an agent through an actor-critic algorithm on a simulation for deep reinforcement learning (DRL) such that the agent is configured to navigate to a waypoint while reducing a probability of colliding with obstacles in an environment and such that the agent is configured to obtain information about the environment outside a current field of view (FOV) of a sensor based on a previous sensor value obtained from the sensor, wherein the training comprises inputting first information to an actor network to determine an action of the agent, inputting second information to a critic to evaluate how helpful the action is to maximizing a reward in the actor-critic algorithm, the second information comprising additional information and the first information such that a portion of the input to the critic is the same as the input to the actor network, wherein the additional information includes a local-map feature not input into the actor network, and training the agent based on a result of the evaluation of the critic, wherein the local-map feature includes information on an overall obstacle deployment situation of a map centered on the agent and includes at least one stationary obstacle and at least one moving object, the first information includes an observation feature and the waypoint, and the local-map feature comprises information about at least one of a velocity of the at least one moving object, or a goal of the at least one moving object.

2. The agent training method of claim 1, wherein the local-map feature is implemented by applying global average pooling to a local-map tensor that passes through a plurality of convolutional layers.

3. The agent training method of claim 1, wherein the observation feature is obtained by projecting a depth scan and a velocity onto respective vectors of the same size and applying an elementwise product to the vectors onto which the depth scan and the velocity are projected.

4. The agent training method of claim 1, wherein the training comprises generating information for the simulation through dynamics randomization of adding noise to at least one of a depth scan, a velocity of the agent, or a timescale.

5. A mobile robot platform equipped with the agent trained through the method according to claim 1.

6. The mobile robot platform of claim 5, further comprising:

a light detection and ranging (LiDAR) device with a 90° field of view; and a processor configured to control a mobile path of the mobile robot platform using the agent and a signal from the LiDAR device.

7. An agent training method for a computer apparatus comprising at least one processor, the agent training method comprising:

training, by the at least one processor, an agent through an actor-critic algorithm on a simulation for deep reinforcement learning (DRL) such that the agent is configured to navigate to a waypoint while reducing a probability of colliding with obstacles in an environment and such that the agent is configured to obtain information about the environment outside a current field of view (FOV) of a sensor based on a previous sensor value obtained from the sensor, wherein the training comprises inputting first information to an actor network to determine an action of the agent, inputting second information to a critic to evaluate how helpful the action is to maximizing a reward in the actor-critic algorithm, the second information comprising additional information and the first information such that a portion of the input to the critic is the same as the input to the actor network, wherein the additional information includes a local-map feature not input into the actor network, and training the agent based on a result of the evaluation of the critic, wherein the local-map feature includes information on an overall obstacle deployment situation of a map centered on the agent and includes at least one stationary obstacle and at least one moving object, at least one of the actor network or the critic comprises a recurrent neural network (RNN) that receives time-series data as an input, and the previous sensor value is stored in the recurrent neural network.

8. The agent training method of claim 7, wherein the RNN comprises a Long-Short Term Memory (LSTM) RNN.

9. The agent training method of claim 8, wherein the LSTM RNN includes a local map critic (LMC) architecture.

10. A computer apparatus comprising:

at least one processor configured to execute computer-readable instructions, wherein the at least one processor is configured to train an agent through an actor-critic algorithm on a simulation for deep reinforcement learning (DRL) such that the agent is configured to navigate to a waypoint while reducing a probability of colliding with obstacles in an environment and such that the agent is configured to obtain information about the environment outside a current field of view (FOV) of a sensor based on a previous sensor value obtained from the sensor, wherein the training the agent comprises inputting first information to an actor network to determine an action of the agent, and inputting second information to a critic to evaluate how helpful the action is to maximizing a reward in the actor-critic algorithm, the second information comprising additional information and the first information such that a portion of the input to the critic is the same as the input to the actor network, wherein the additional information includes a local-map feature not input into the actor network, and training the agent based on a result of the evaluation of the critic, wherein the local-map feature includes information on an overall obstacle deployment situation of a map centered on the agent and includes at least one stationary obstacle and at least one moving object, the first information includes an observation feature and the waypoint, and the local-map feature comprises information about at least one of a velocity of the at least one moving object, or a goal of the at least one moving object.

11. A mobile robot platform equipped with the computer apparatus of claim 10.

* * * * *